Patented June 20, 1950

2,511,890

UNITED STATES PATENT OFFICE 2,511,890

HETEROCYCLIC COMPOUNDS AND THEIR PREPARATION

Richard R. Whetstone, Berkeley, Calif., assignor to Shell Development Company, San Francisco, Calif., a corporation of Delaware No Drawing. Application May 19, 1947, Serial No. 749,077

13 Claims. (Cl. 260—338)

This invention relates to new chemical compounds and to a method for their preparation. More particularly, the present invention relates to certain oxygen-containing, heterocyclic compounds, and to a method for their preparation.

The compounds to which the present invention relates may be referred to and defined as containing the bicyclic structural unit

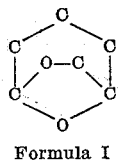

Formula I in which only the essential elements, or atoms, of the cyclic structure are shown, it being understood that the carbon atoms in the structural unit, as it appears in Formula I and in similar structural formula herein, are bonded to sufficient additional atoms or groups of atoms to satisfy the requirements of the laws of valency pertaining to the tetravalency of the carbon atom.

In accordance with the rules of nomenclature described in "The Ring Index. Ring Systems Used in Organic Chemistry," by Patterson and Capell, Reinhold, 1940, the compounds containing this bicyclic structure may be referred to as the 6,8-dioxabicyclo[3.2.1]octanes. According to an alternative mode of nomenclature, the compounds of the present invention could be referred to generically as 2,6-epoxymethanotetrahydropyrans. For the purposes of this latter form of nomenclature, the several positions in the bicyclic structural unit may be designated as follows:

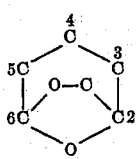

Formula II

When compounds containing the foregoing structural unit are described as dioxabicyclo- octanes, it is convenient to refer to the positions in the rings as follows:

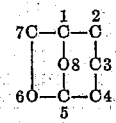

Formula III

In the present specification and claims, reference to the present compounds as dioxabicyclooctanes will be made on the basis of this latter designation of positions, and reference to the present compounds as derivatives of tetrahydropyran will be made on the basis of the numerical designation of positions expressed in Formula II.

It has been discovered that compounds containing the foregoing structural unit may be prepared by subjecting a derivative of 3,4-dihydro-1,2-pyran having a carboxyl group or a methanol group attached to the carbon atom in the 2-position of the dihydropyran ring to conditions which favor cyclization reaction leading to their conversion to compounds of the herein defined class. It has been found that the cyclization reaction may be effected by subjecting the stated derivatives of dihydropyran to suitable conditions of temperature and/or suitable conditions of acidity as provided by the presence of an acid or an acid reacting material, for a period of time sufficient to cause the reaction to take place. It has been discovered that when a 3,4-dihydropyran-2-carboxylic acid is thus treated, there may be obtained in excellent yield a 7-oxo-6,8-dioxabicyclo[3.2.1]octane (alternatively, a 2,6-epoxyoxomethano-tetrahydropyran) having a structure that may be represented by the schematic formula:

Formula IV

When a 3,4-dihydro-1,2-pyran-2-methanol is thus treated in accordance with the process of the present invention, there may be obtained a 6,8- dioxabicyclo[3.2.1]octane (alternatively, a 2,6-epoxymethano-tetrahydropyran) having a structure that may be represented by the schematic formula

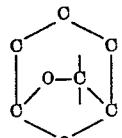

Formula V

Novel heterocyclic compounds according to the foregoing formulas may be prepared according to the present invention from a wide variety of derivatives of 3,4-dihydro-1,2-pyran that have a carboxyl group or a methanol group attached to the carbon atom in the 2 position of the dihydropyran ring. The derivatives thus employed in the process of the present invention may contain only the methanol or the carboxyl extranuclear substituent group, as in the specific compounds 3,4-dihydro-1,2-pyran-2-carboxylic acid and 3,4-dihydro-1,2-pyran-2-methanol, or they may contain in addition to the carboxyl group or the methanol group one or more additional univalent groups, or atoms other than hydrogen attached to carbon atoms in the dihydropyran ring. Representative univalent groups, and atoms other than hydrogen which thus may be present include, among others, the following: one or more alkyl groups, such as methyl, ethyl, propyl, isopropyl, the butyls, the pentyls, and homologs thereof; one or more alkenyl groups, such as vinyl, allyl, crotyl, alpha-methylallyl, butadienyl, isopropenyl, and their homologs and analogs; one or more isocyclic groups, including the cycloalkyl groups, such as the cyclohexyl and cyclopentyl groups and their homologs, cycloalkenyl groups such as cyclohexenyl, cyclopentenyl, and homologs thereof, aromatic groups such as phenyl, tolyl, xylyl, benzyl, phenethyl, naphthyl, and the like, heterocyclic groups such as furfuryl, furyl, tertahydrofurfuryl, tetrahydropyranyl, sulfur-containing heterocyclic groups, analogous and homologous heterocyclic groups; and analogs and homologs and substitution products of the foregoing and related substituent groups. Such additional organic groups may be directly bonded by a univalent carbon-to-carbon bond to a carbon atom of the dihydropyran ring, or they may be connected to a carbon atom of the dihydropyran ring through an intervening atom of an element other than carbon, such as an oxygen atom, a sulfur atom, or the like.

Bicyclic heterocyclic compounds of the herein defined class also may be prepared from 3,4-dihydro-1,2-pyran-2-methanols in which either one or both of the hydrogen atoms attached to the carbon atom of the methanol group have been replaced by univalent substituent groups. The substituent groups may be either univalent hydrocarbyl groups, such as alkyl, aryl, alkaryl, aralkyl, or the like, or they may comprise, for example, a hydrocarbyl group bonded to the carbon atom of the methanol group through an atom of an element other than carbon, for example oxygen as in alkoxy, aryloxy, acyloxy and similar groups.

The following examples will illustrate certain of the compounds that form the subject of the present invention, and also will illustrate certain specific embodiments of the process by which these and related compounds may be prepared. It will be understood that the examples are presented for the purposes of illustration, and not to limit the invention as it is more broadly described herein and defined in the appended claims. In the examples, the parts are parts by weight.

Example I

Seventy-five parts of the ethyl ester of 3,4-dihydro-1,2-pyran-2-carboxylic acid were dissolved in a solution prepared by dissolving 20 parts of sodium hydroxide in a mixture of 200 parts of water and 40 parts of ethanol. The water and the ethanol were removed from the resulting solution by distillation. The remaining residue, comprising the sodium salt of the free acid, was acidified by addition of sufficient 6 normal hydrochloric acid. The acidified residue was extracted with a total of 1050 parts of ether. The ether was evaporated from the ethereal solution, and the residue was subjected to distillation under reduced pressure. There were recovered 47 parts of 7-oxo-6,8-dioxabicyclo[3.2.1]octane distilling at 62° C. to 64° C. under a pressure of 3 millimeters of mercury and having a refractive index $(n_D^{20})$ of 1.4587. This compound, which also may be referred to as 2,6-epoxyoxomethanotetrahydropyran, and also as the lactone of 6-hydroxytetrahydropyran-2-carboxylic acid, has a structure that may be represented by the structural formula

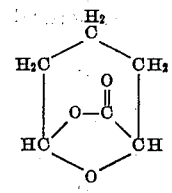

At normal room temperatures, the samples that have been prepared of this compound have been clear, essentially colorless, mobile liquids having a low degree of volatility. The preparations were solidified by cooling to below about 5° C., but upon rewarming melted at about 10° C.

Example II

The cyclic "dimer" of methacrolein, believed to have the structure of 2,5-dimethyl-3,4-dihydro-1,2-pyran-2-carboxaldehyde, was treated at 40° C. to 50° C. with 2 molar equivalents of sodium hydroxide in the form of a 40 per cent by weight aqueous solution. The nearly solid resultant mixture was diluted with water and exhaustively extracted with ether, thereby removing the dimethyldihydropyran methanol formed during the intramolecular oxidation and reduction of the dimethyldihydropyran carboxaldehyde. The remaining residue was acidified with 6 normal hydrochloric acid. The acidified residue was heated to the reflux temperature under a pressure of 8 to 10 millimeters of mercury, and then distilled under reduced pressure. The compound having the apparent structure of 1,4-dimethyl-7-oxo-6,8-dioxabicyclo[3.2.1]octane was recovered in a yield of about 90 per cent based on the amount of the dimer converted to the corresponding dimethyldihydropyran carboxylic acid. 1,4-dimethyl-7-oxo-6,8-dioxabicyclo[3.2.1]octane also may be referred to as 2,5-dimethyl-2,6-epoxyoxomethanotetrahydropyran, and also as the lactone of 6-hydroxy-2,5-dimethyltetrahydropyran-2- carboxylic acid. Its structure thus would be as follows:

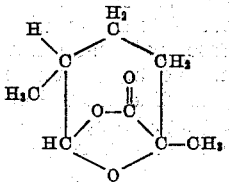

It was found to distill at about 82° C. under a pressure of 10 millimeters of mercury and to have a refractive index ($n_D^{20}$) of 1.4482. In one preparation, the following results were obtained upon analysis of the compound as prepared:

|  | Calculated | Found |
|---|---|---|
| Per cent carbon | 61.51 | 61.38 |
| Per cent hydrogen | 7.75 | 7.80 |

*Example III*

One hundred parts of the "codimer" of acrolein and methacrolein, identified as having the structure of 2-methyl-3,4-dihydro-1,2-pyran-2-carboxaldehyde, was converted to the corresponding methyldihydropyran carboxylic acid in a manner similar to that employed in the foregoing example. The alkaline residue remaining after the exhaustive extraction with ether was acidified with 6 normal hydrochloric acid, as in the preceding example, and the acidified residue extracted with a further portion of ether. Evaporation of the ether left 67 parts of a viscous oil. Distillation of the oil resulted in the separation of 37 parts of a colorless, mobile liquid distilling at 80° C. to 80.5° C. under a pressure of 10 millimeters of mercury. This liquid was identified as the compound having the apparent structure of 1-methyl-7-oxo-6,8-dioxabicyclo[3.2.1]-octane. It was found to contain 7.08 per cent H, compared to a calculated value of 7.04 per cent. The 1-methyl-7-oxo-6,8-dioxabicyclo[3.2.1]octane also may be referred to as 2-methyl-2,6-epoxyoxomethanotetrahydropyran, or as the lactone of 6-hydroxy-2-methyltetrahydropyran-2-carboxylic acid. Its structure thus would correspond to the following structural formula:

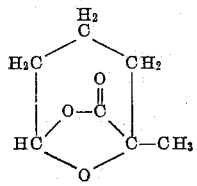

*Example IV*

Four parts of a 1 normal solution of hydrogen chloride in methanol were added to 100 parts of 2,5-dimethyl-3,4-dihydro-1,2-pyran-2-methanol dissolved in 55 parts of methanol. An exothermic reaction occurred. The mixture was maintained at 40° C. to 50° C. for about 1.5 hours. The mixture then was cooled and rendered neutral by contacting with an anion-exchange synthetic resin to selectively remove the hydrogen chloride. The neutral solution was distilled. There were recovered 83 parts of a mobile liquid distilling at 52.8° C. to 53.0° C. under a pressure of 11 millimeters of mercury and having a refractive index ($n_D^{20}$) of 1.4463. This product was identified as having the probable structure of 1,4-dimethyl-6,8-dioxabicyclo[3.2.1]octane (alternatively 2,5-dimethyl-2,6-epoxymethanotetrahydropyran), corresponding to the structural formula

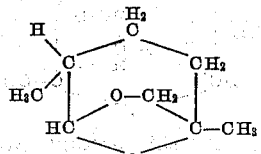

It had an odor suggestive of mint. It was insoluble in water but soluble in dilute aqueous acid upon prolonged agitation. It gave a delayed precipitate when treated with the 2,4-dinitrophenylhydrazone reagent and did not decolorize a solution of bromine in carbon tetrachloride. Analyses of the product as obtained in one experiment are as follows:

|  | Calculated | Found |
|---|---|---|
| Per cent carbon | 67.56 | 67.07 |
| Per cent hydrogen | 9.92 | 9.87 |
| Hydroxyl value, equiv./100 g | 0 | .005 |

*Example V*

Twenty parts of 2,5-dimethyl-3,4-dihydro-1,2-pyran-2-methanol were homogenized with 34 parts of water and 18 parts of glacial acetic acid. After a brief period a second phase appeared in the homogenized mixture. An additional amount of 10 parts of acetic acid, and 1 part of 10 per cent aqueous hydrochloric acid were added and the resultant homogeneous mixture was maintained at 90° C. to 95° C. for 12 hours. The mixture was diluted with water until a second phase formed; the non-aqueous phase was extracted with ether, the ether extract was dried, and distilled. There were recovered 14 parts of the same compound that was prepared in the immediately preceding example.

*Example VI*

Fifty-six parts of the dimer of methacrolein, 2,5-dimethyl-3,4-dihydro-1,2-pyran-2-carboxaldehyde, were mixed with methanol in a 1:2 molar ratio, and to the mixture there was added 1 per cent by volume of a 0.7 N solution of hydrogen chloride in methanol. An exothermic reaction occurred. After one hour at 35° C. to 40° C., the mixture was neutralized by addition of calcium carbonate, filtered, and distilled under a pressure of 10 millimeters of mercury. The following fractions were separated:

| Distillation Range, °C. | Amount, parts |
|---|---|
| 67.2 to 69.0 | 12 |
| 69.0 to 77.0 | 17 |
| 77.0 to 77.8 | 12 |
| 77.8 to 96.3 | 26 |
| bottoms | 2 |

Upon redistillation of the fraction collected between 67.2° C. and 69.0° C., there were recovered 6 parts of a mobile, essentially colorless liquid distilling at 66° C. to 66.5° C. under a pressure of 9.5 millimeters of mercury and containing 62.84 per cent carbon and 9.40 per cent hydrogen. It was identified as having the apparent structure of 7-methoxy-1,4-dimethyl-6,8-dioxabicyclo

[3.2.1]octane corresponding to the structural formula:

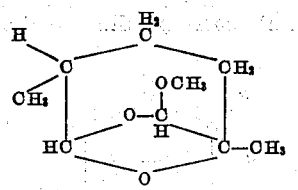

It is believed that this product was formed by reaction of the hemiacetal of the dimer (i. e., by reaction of 2,5 - dimethyl - 3,4 - dihydro - 1,2 - pyran - 2 - (alpha - methoxy)methanol) to form, under the conditions of the experiment, the bicyclic structure represented in the formula. The higher boiling fractions separated in the experiment were found to contain, among other products, the product formed by addition of methanol to the olefinic bond of the dihydropyran ring, i. e., 6-methoxy-2,5-dimethyltetrahydropyran-2-carboxaldehyde, and also its dimethyl acetal.

The overall reactions by which the present compounds may be prepared are thought to correspond to the following equations

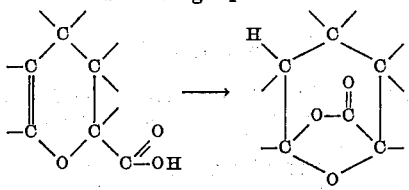

and

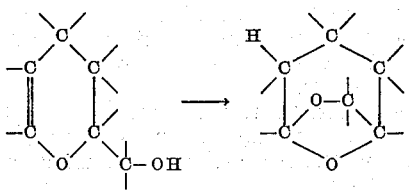

The foregoing reactions may be effected by subjecting the dihydropyran derivative to conditions of elevated temperature and/or to suitable conditions of acidity, for sufficient time. The reactions may be effected with the dihydropyran derivative in an essentially pure state, or the desired reaction may be effected in the presence of a solvent or dispersing medium, such as a suitable organic solvent. Alcohols, ethers, ketones, esters, the aliphatic and the aromatic hydrocarbons, halogenated hydrocarbons, and the like, are suitable solvent media. Water may be present in the reaction medium in amounts that are not excessive and that preferably constitute not more than a minor proportion of the total mixture.

The above reactions may be effected by heating the derivative of dihydropyran in the absence of any added acid or added acid-reacting material to temperatures of from about 35° C. to about 200° C. A preferred temperature range in the case of 3,4-dihydro-1,2-pyran-2-carboxylic acid and its derivatives is from about 35° C. to 125° C. Somewhat higher temperatures, say from about 50° C. to about 125° C., are preferred for the preparation of 6,8 - dioxabicyclo[3.2.1]octanes from 3,4-dihydro-1,2-pyran-2-methanol and its substitution products when the reaction is effected by the agency of heat alone. The presence of acid or of an acidifying agent has been found to favor the desired reaction, and in certain cases to markedly accelerate the formation of the desired bicyclic products. Hydrochloric acid is eminently satisfactory as the acidifying agent, although other acids or acid reacting materials may be employed. Sulfuric acid, phosphoric acid, acetic acid, para-toluenesulfonic acid, chloroacetic acid, sodium acid sulfate, zinc chloride, aluminum sulfate, potassium dihydrogen phosphate and other acidifying materials thus also may be employed. The amount of the acidifying agent that is employed may be from a mere trace up to an amount more than molecularly equivalent to the amount of dihydropyran derivative that is present. Generally speaking, amounts of the acid-reacting material up to about 10 per cent by weight of the dihydropyran are preferable. When the cyclization reaction is effected with the aid of an added acid or acid-reacting material, there desirably are employed lower temperatures than when no added acid or acid-reacting material is present. The desired cyclization reactions may be effected at room temperatures or below by treatment of the dihydropyran derivative with a strong mineral acid in the above indicated quantities. Generally speaking, it is preferred to employ temperatures of from about 0° C. to about 75° C. when the cyclization reaction is effected with the aid of added acids or acid-reacting materials.

The process may be executed in either a batchwise, intermittent, or continuous manner. The dihydropyran derivative in admixture with the acid reacting material, if one is employed, thus may be subjected to a suitable temperature for a period of time that may be varied from a few minutes to several hours or more. In some cases, the dihydropyran derivative may be subjected directly to distillation, the heat required for the distillation also serving to cause the desired cyclization reaction to take place. In other cases, the dihydropyran derivative, either in the essentially pure state or, as illustrated in certain of the examples, in the form of a solution in a suitable solvent, may be treated with an acid such as a strong mineral acid in an effective amount. After the reaction is completed, the acid may be neutralized by the addition of a base or other alkaline materials or it may be removed by adsorption on a suitable adsorbent. After completion of the reaction, the 6,8-dioxabicyclo[3.2.1]octane may be recovered in any suitable manner from the reaction mixture and/or other possible products formed during the treatment. Treatment with selective solvents, fractional distillation, fractional crystallization, for example at low temperatures, and other known methods may be employed to recover the desired products of the reaction.

As has been indicated in the previous discussion herein of the invention, a wide variety of oxygen-containing, bicyclic, heterocyclic compounds containing the structural unit defined in a preceding paragraph, may be prepared by the process of the invention. From the standpoint of the convenience with which they may be prepared, and the availability of the necessary raw materials, certain preferred groups of compounds in the present invention may be represented by the formulas

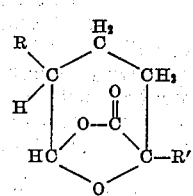

Formula VI and

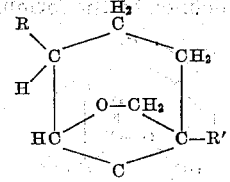

Formula VII in which R and R¹ each represents either the hydrogen atom or an organic group, preferably a lower alkyl group. The compounds defined by these formulas may be prepared advantageously from the alpha,beta-unsaturated aldehydes having structures defined by the formula

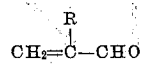

Formula VIII in which R is as above, by means of the following reactions, the two R's being the same or different:

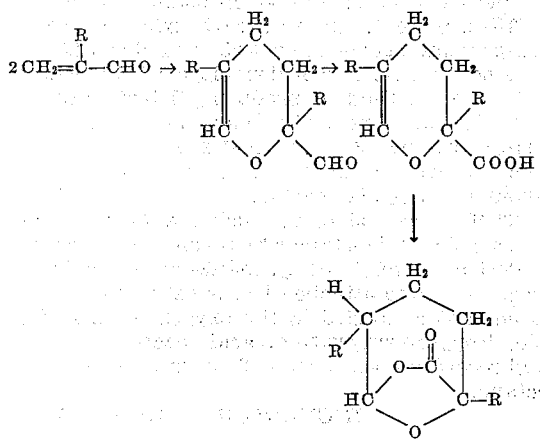

and

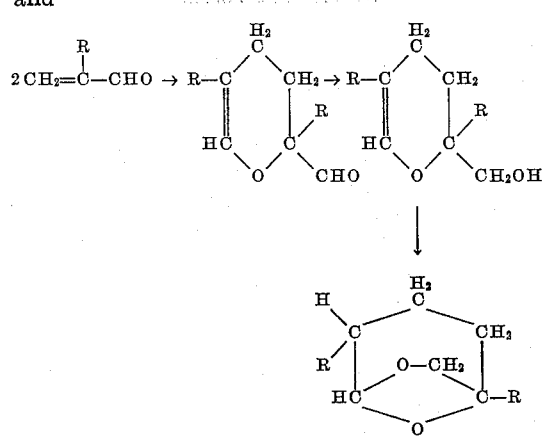

Acrolein, methacrolein, alpha-ethylacrolein or a homologous alpha, beta-unsaturated aldehyde having a structure defined by Formula VIII, or a mixture of two or more such aldehydes, may be caused to react to form a dihydropyran carboxaldehyde as indicated in the preceding equations by heating in the presence of a polymerization inhibitor, such as hydroquinone, and a solvent, such as benzol. The resultant dihydropyran carboxaldehyde may be oxidized by suitable procedures to the corresponding carboxylic acid, or it may be reduced at the formyl group to obtain the corresponding methanol-substituted dihydropyran. In the case of the dihydropyran carboxaldehyde that is obtainable from acrolein, a particularly efficaceous method of effecting its oxidation to the corresponding carboxylic acid forms in part the subject matter of the copending application Serial No. 706,102 filed October 28, 1946, now Patent No. 2,479,283, issued August 16, 1949. The reduction of the dihydropyran carboxaldehyde to the dihydropyran methanol may be effected catalytically, as by reaction with molecular hydrogen, or chemically as by treatment with aluminum alcoholate in the presence of alcohol. The preparation of dihydropyran carboxaldehydes and certain derivatives thereof from methacrolein, alpha-ethylacrolein and their homologs forms in part the subject matter of the copending application, Serial No. 713,455, filed December 2, 1946.

The compounds defined by Formulas VI and VII, as well as other compounds provided by the present invention are of particular value as chemical intermediates for the preparation of derived organic chemicals. From the standpoint of structure, the compounds represented in Formulas IV and VI may be regarded as lactones, i. e., inner-esters, of 6-hydroxytetrahydropyran-2-carboxylic acids. These latter compounds, in turn, may be regarded as inner hemi-acetals of aliphatic carboxylic acids containing both a hydroxyl group and a formyl group. On the other hand, the compounds represented in Formulas V and VII may be regarded, from the standpoint of structure, as inner acetals of aliphatic dihydroxy aldehydes. Because of these distinguishing characteristics, which are reflected in certain of their chemical properties, the two groups of compounds represented in Formulas VI and VII, respectively, may be employed as raw materials for the preparation of numerous useful polyfunctional compounds. They may be hydrolyzed under suitable conditions to acyclic polyfunctional compounds which, in turn, may be utilized for the preparation of substituted acids, of polyhydric alcohols, and of similar compounds of polyfunctional character. The compounds represented in Formula VI thus may be employed to prepare useful polyfunctional carboxylic acids which, in turn, may be converted to numerous useful derivatives. The compounds represented in Formula VII, on the other hand, are useful as raw materials for the preparation of hydroxylic aldehydes which, for example, may be reduced to polyhydric alcohols or otherwise employed to gainful ends. The bicyclic inner acetals represented in Formula VII are in most cases clear, mobile liquids having a relatively low degree of volatility under atmospheric pressures. They have a beneficent solvent action upon numerous substances. They appear to be of significant value as solvents in special applications and as plasticizers.

I claim as my invention:

1. The chemical compound having a structure defined by the formula:

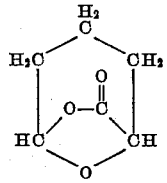

2. The chemical compound having a structure defined by the formula:

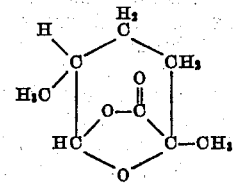

3. The chemical compounds having structures defined by the formula:

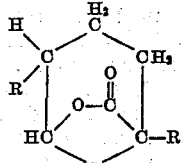

in which R and R' represent members of the group consisting of the hydrocarbon radicals and the hydrogen atom.

4. The chemical compounds according to claim 3 when R represents hydrogen and R' represents a lower alkyl group.

5. The chemical compounds according to claim 3 when R and R' represent lower alkyl groups.

6. As a new chemical compound, a 7-oxo-6,8-dioxabicyclo[3.2.1]octane.

7. As a new chemical compound a 6,8-dioxabicyclo[3.2.1]octane.

8. The method of preparing bicyclic heterocyclic compounds which comprises treating a derivative of 3,4-dihydro-1,2-pyran having a carboxyl group attached to the saturated carbon atom that is bonded to the oxygen atom in the dihydropyran ring with a strong mineral acid at between about 0° C. and about 75° C.

9. The method of preparing a bicyclic heterocyclic compound which comprises heating a derivative of 3,4-dihydro-1,2-pyran having a carboxyl group attached to the saturated carbon atom that is bonded to the heterocyclic oxygen atom, to a temperature between about 35° C. and about 200° C.

10. The method of producing a compound having a structure defined by the formula

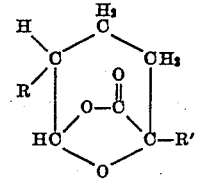

which comprises treating with a strong mineral acid at a temperature between about 0° C. and about 75° C., a compound having a structure defined by the formula

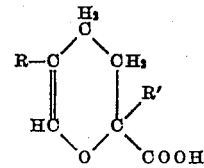

in both formulas R and R' representing members of the class consisting of the hydrocarbon radicals and the hydrogen atom.

11. The method of preparing a 7-oxo-6,8-dioxabicyclo[3.2.1]octane which comprises heating a 3,4-dihydro-1,2-pyran-2-carboxylic acid to a temperature between about 35° and about 125° C. to produce a 7-oxo-6,8-dioxabicyclo[3.2.1]octane.

12. The method of producing 1,4-dimethyl-7-oxo-6,8-dioxabicyclo[3.2.1]octane which comprises treating 3,4-dihydro-1,2-pyran-2-carboxylic acid with an acid at a temperature between about 0° C. and about 75° C.

13. The method of producing a 7-oxo-6,8-dioxabicyclo[3.2.1]octane which comprises treating a derivative of 3,4-dihydro-1,2-pyran having a carboxyl group attached to the saturated carbon atom that is bonded to the oxygen atom in the dihydropyran ring with an acid-reacting material and recovering the 7-oxo-6,8-dioxabicyclo[3.2.1]-octane.

RICHARD R. WHETSTONE.

No references cited.